United States Patent
Hong et al.

(10) Patent No.: US 11,927,985 B2
(45) Date of Patent: Mar. 12, 2024

(54) WEARABLE ELECTRONIC DEVICE AND EXTERNAL ELECTRONIC DEVICE ACCOMMODATING WEARABLE ELECTRONIC DEVICE

(71) Applicant: Samsung Electronics Co., Ltd., Suwon-si (KR)

(72) Inventors: Myeongjae Hong, Suwon-si (KR); Hyunmo Yang, Suwon-si (KR); Seungnyun Kim, Suwon-si (KR); Junwhon Uhm, Suwon-si (KR); Yongseob Yun, Suwon-si (KR); Jongmin Yoon, Suwon-si (KR); Junmyeong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/703,184

(22) Filed: Mar. 24, 2022

(65) Prior Publication Data
US 2022/0374040 A1 Nov. 24, 2022

Related U.S. Application Data

(63) Continuation of application No. PCT/KR2022/003379, filed on Mar. 10, 2022.

(30) Foreign Application Priority Data

May 18, 2021 (KR) .................. 10-2021-0063924

(51) Int. Cl.
*G06F 1/16* (2006.01)
*G02B 27/01* (2006.01)
*G06F 3/01* (2006.01)

(52) U.S. Cl.
CPC ......... *G06F 1/163* (2013.01); *G02B 27/0176* (2013.01); *G06F 3/012* (2013.01); *G06F 3/013* (2013.01); *G02B 2027/0178* (2013.01)

(58) Field of Classification Search
CPC .......... G06F 1/163; G06F 3/012; G06F 3/013; G06F 1/1632; G06F 1/1637; G06F 1/266;
(Continued)

(56) References Cited

U.S. PATENT DOCUMENTS

| 10,019,964 B1* | 7/2018 | Patel .................. G01B 7/14 |
| 2011/0304715 A1 | 12/2011 | Yamada et al. |
| 2013/0007301 A1* | 1/2013 | Jung .................. G06F 1/1632 710/10 |
| 2015/0200554 A1* | 7/2015 | Marks .................. H02J 7/0044 320/108 |

(Continued)

FOREIGN PATENT DOCUMENTS

| CN | 111568013 A | 8/2020 |
| JP | 2006139113 A | 6/2006 |

(Continued)

OTHER PUBLICATIONS

International Search Report and Written Opinion of the International Searching Authority dated Jun. 13, 2022, in connection with International Application No. PCT/KR2022/003379, 12 pages.

*Primary Examiner* — Mihir K Rayan

(57) ABSTRACT

A wearable electronic device accommodatable in an external electronic device may include a communication circuit, and at least one processor. The at least one processor may be configured to identify that the wearable electronic device is accommodated in the external electronic device, receive information on at least one device included in the external electronic device from the external electronic device through the communication circuit, in response to identifying that the wearable electronic device is accommodated in the (Continued)

external electronic device, based on information on at least one device included in the wearable electronic device and the information on the at least one device included in the external electronic device, identify a first device among the at least one device included in the wearable electronic device and identify a second device among the at least one device included in the external electronic device, based on data obtained through the first device, identify first data configured to control the second device, and transmit the first data to the external electronic device through the communication circuit. Various other embodiments may be possible.

17 Claims, 7 Drawing Sheets

(58) Field of Classification Search
CPC ............... G06F 3/017; G02B 27/0176; G02B 2027/0178; G02B 27/0093; G02B 2027/0138; G02B 2027/014; G02B 27/0172

See application file for complete search history.

(56) References Cited

U.S. PATENT DOCUMENTS

| | | | |
|---|---|---|---|
| 2015/0326638 A1* | 11/2015 | Yarygin | .................. H04L 65/80 |
| | | | 709/219 |
| 2017/0363875 A1 | 12/2017 | Yoshida | |
| 2019/0028578 A1 | 1/2019 | Parienti | |
| 2019/0272800 A1 | 9/2019 | Tao et al. | |
| 2020/0073148 A1* | 3/2020 | Alhaideri | ................ G02F 1/172 |
| 2020/0073455 A1* | 3/2020 | Na | ....................... G06F 13/4282 |
| 2020/0096774 A1* | 3/2020 | Trail | ....................... G06F 1/163 |
| 2022/0231523 A1* | 7/2022 | Bristol | .................... H02J 50/90 |
| 2022/0400173 A1* | 12/2022 | Gangwal | ................ A45C 15/00 |

FOREIGN PATENT DOCUMENTS

| | | | |
|---|---|---|---|
| JP | 2011-232550 | A | 11/2011 |
| JP | 2012-004717 | A | 1/2012 |
| JP | 6687016 | B2 | 4/2020 |
| KR | 10-2013-0073262 | A | 7/2013 |
| KR | 10-2015-0085587 | A | 7/2015 |
| KR | 20180105689 | A | 9/2018 |
| WO | 2015/108225 | A1 | 7/2015 |

* cited by examiner

WEARABLE ELECTRONIC DEVICE AND EXTERNAL ELECTRONIC DEVICE ACCOMMODATING WEARABLE ELECTRONIC DEVICE

CROSS-REFERENCE TO RELATED APPLICATIONS

This application is a continuation of International Application No. PCT/KR2022/003379 filed on Mar. 10, 2022, which claims priority to Korean Patent Application No. 10-2021-0063924 filed on May 18, 2021, in the Korean Intellectual Property Office, the disclosures of which are incorporated by reference herein in their entirety.

BACKGROUND

1. Field

Various embodiments relate to a wearable electronic device and an external electronic device configured to accommodate a wearable electronic device.

2. Description of Related Art

Various wearable electronic devices have recently been widespread. The wearable electronic devices may be, for example, AR glass-type wearable electronic devices that can be worn on faces like glasses. The wearable electronic devices may be watch-type electronic devices that can be worn by users on wrists.

A wearable electronic device may be accommodated in a case or accommodated in another electronic device. for example, when accommodating a wearable electronic device, another electronic device may charge the wearable electronic device.

SUMMARY

A wearable electronic device is worn on a part of the user's body, and may thus have a limited size or weight. Therefore, there may be restrictions on the type or specification of hardware (for example, sensor, display, input device, and output device) that the wearable electronic device may include.

A wearable electronic device according to various embodiments, when accommodated in an external electronic device, may identify devices supposed to interact with each other among devices included in the wearable electronic device and devices included in the external electronic device, and may control the devices included in the external electronic device, based on data obtained through the devices included in the wearable electronic device.

A wearable electronic device accommodatable in an external electronic device according to various embodiments may include at least one processor, wherein the at least one processor is configured to identify that the wearable electronic device is accommodated in the external electronic device, receive information on at least one device included in the external electronic device from the external electronic device, in response to identifying that the wearable electronic device is accommodated in the external electronic device, based on information on at least one device included in the wearable electronic device and the information on the at least one device included in the external electronic device, identify a first device among the at least one device included in the wearable electronic device and identify a second device among the at least one device included in the external electronic device, based on data obtained through the first device, identify first data configured to control the second device, and transmit the first data to the external electronic device.

A method performed by a wearable electronic device according to various embodiments may include identifying that the wearable electronic device is accommodated in an external electronic device, receiving information on at least one device included in the external electronic device from the external electronic device, in response to identifying that the wearable electronic device is accommodated in the external electronic device, based on information on at least one device included in the wearable electronic device and the information on the at least one device included in the external electronic device, identifying a first device among the at least one device included in the wearable electronic device and identifying a second device among the at least one device included in the external electronic device, identifying first data configured to control the second device, based on data obtained through the first device, and transmitting the first data to the external electronic device.

An electronic device configured to accommodate a wearable electronic device according to various embodiments may include at least one processor, wherein the at least one processor is configured to identify that the wearable electronic device is accommodated in the electronic device, receive information on at least one device included in the wearable electronic device from the wearable electronic device, in response to identifying that the wearable electronic device is accommodated in the external electronic device, based on the information on the at least one device included in the wearable electronic device and information on at least one device included in the electronic device, identify a first device among the at least one device included in the wearable electronic devices and identify a second device among the at least one device included in the electronic device, receive, from the wearable electronic device, first data identified based on data obtained through the first device, and control the second device, based on the received first data.

According to various embodiments, a wearable electronic device and an external electronic device configured to accommodate a wearable electronic device are provided. A wearable electronic device according to various embodiments, when accommodated in an external electronic device, may identify devices supposed to interact with each other among devices included in the wearable electronic device and devices included in the external electronic device, and may control the devices included in the external electronic device, based on data obtained through the devices included in the wearable electronic device. while including limited hardware devices, the wearable electronic device may form an extended system capable of utilizing resources included in the external electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
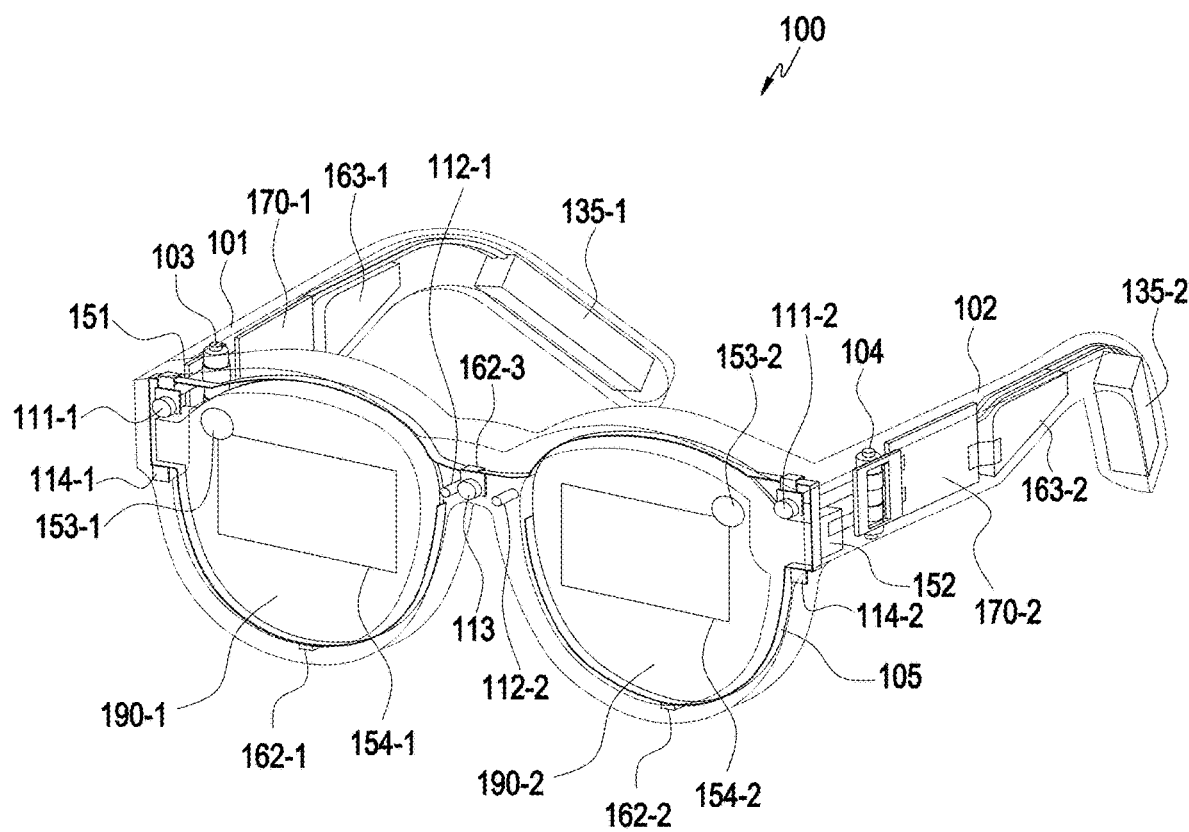
FIG. 1 illustrates a structure of a wearable electronic device according to various embodiments.

FIG. 1 illustrates a structure of a wearable electronic device according to various embodiments. According to various embodiments, the wearable electronic device 100 may include a frame 105, a first support 101, a second support 102, and a first hinge configured to connect the frame 105 to the first support 101, and/or a second hinge 104 configured to connect the frame 105 to the second support 102. According to one embodiment, the frame 105 may include at least one camera (e.g., a first camera 111-1 and 111-2, a second camera 112-1 and 112-2, and/or a third camera 113), one or more light emitting elements 114-1 and 114-2, at least one display (e.g., a first display 151 and a second display 152), one or more voice input devices 162-1, 162-2, and 162-3, or one or more transparent members 190-1 and 190-2. According to various embodiments, the wearable electronic device 100 may include one or more first cameras 111-1 and 111-2, one or more second cameras 112-1 and 112-2, and/or one or more third cameras 113. According to various embodiments, an image acquired through the one or more first cameras 111-1 and 111-2 may be used for detecting a user's hand gesture, tracking the user's head, and/or recognizing a space. According to various embodiments, the one or more first cameras 111-1 and 111-2 may include a global shutter (GS) camera. According to various embodiments, the one or more first cameras 111-1 and 111-2 may perform a simultaneous localization and mapping (SLAM) operation via depth imaging. According to various embodiments, the one or more first cameras 111-1 and 111-2 may perform spatial recognition for 6 degrees of freedom (DoF).

According to various embodiments, an image acquired through one or more second cameras 112-1 and 112-2 may be used to detect and track the user's pupils. According to various embodiments, the one or more second cameras 112-1 and 112-2 may include a GS camera. According to various embodiments, one of the one or more second cameras 112-1 and 112-2 may correspond to the left eye, and the other may correspond to the right eye. The one or more second cameras 112-1 and 112-2 may have substantially the same performance.

According to various embodiments, the one or more third cameras 113 may be high-resolution cameras. According to various embodiments, the one or more third cameras 113 may perform an auto-focusing (AF) function and an optical image stabilizer function. According to various embodiments, the one or more third cameras 113 may be a GS camera or a rolling shutter (RS) camera.

According to various embodiments, the wearable electronic device 100 may include one or more light emitting elements 114-1 and 114-2. The light emitting elements 114-1 and 114-2 are different from a light source configured to emit light to a screen output area of a display, which will be described later. According to various embodiments, the light emitting elements 114-1 and 114-2 may emit light to facilitate detection of the pupils in detecting and tracking the pupils of the user through the one or more second cameras 112-1 and 112-2. According to various embodiments, each of the light emitting elements 114-1 and 114-2 may include an LED. According to various embodiments, the light emitting elements 114-1 and 114-2 may emit light in an infrared region. According to various embodiments, the light emitting elements 114-1 and 114-2 may be attached around the frame 105 of the wearable electronic device 100. According to various embodiments, the light emitting elements 114-1 and 114-2 may be positioned around one or more of the first cameras 111-1 and 111-2, respectively, and may assist the one or more first cameras 111-1 and 111-2 in detecting a gesture, tracking a head, and/or recognizing a space when the wearable electronic device 100 is used in a dark environment. According to various embodiments, the light emitting elements 114-1 and 114-2 may be positioned around the one or more third cameras 113 and may assist the one or more third cameras 113 in acquiring an image when the wearable electronic device 100 is used in a dark environment.

According to various embodiments of the disclosure, the wearable electronic device 100 may include a first display 151, a second display 152, which are positioned on a frame 105, one or more input optical members 153-1 and 153-2, one or more transparent members 190-1 and 190-2, and one or more screen display portions 154-1 and 154-2. According to various embodiments, the first display 151 and the second display 152 may include, for example, a liquid crystal display 1 (LCD), a digital mirror device (DMD), a liquid crystal on silicon (LCoS), an organic light emitting diode (OLED), or a micro light emitting diode (micro LED). According to various embodiments, when the first display 151 and the second display 152 are formed of one of a liquid crystal display, a digital mirror device, or a liquid crystal on silicon, the wearable electronic device 100 may include a light source configured to emit light to a screen output area of a display. According to other various embodiments, when the first display 151 and the second display 152 can autonomously emit light, for example, when the same are formed of one of an organic light emitting diode or a micro LED, the wearable electronic device 100 may provide a virtual image of good quality to a user even without including a separate light source.

According to various embodiments, the one or more transparent members 190-1 and 190-2 may be disposed to face the user's eyes when the user wears the wearable electronic device 100. According to various embodiments, the one or more transparent members 190-1 and 190-2 may include at least one of a glass plate, a plastic plate, and a polymer. According to various embodiments, when the user wears the wearable electronic device 100, the user may see the outside world through one or more transparent members 190-1 and 190-2. According to various embodiments, the one or more input optical members 153-1 and 153-2 may guide light generated by the first display 151 and the second display 152 to the user's eyes. According to various embodiments, an image based on light generated by the first display 151 and the second display 152 may be formed on the one or more screen display portions 154-1 and 154-2 on the one or more transparent members 190-1 and 190-2, and the user may see the image formed on the one or more screen display portions 154-1 and 154-2.

According to various embodiments, the wearable electronic device 100 may include one or more optical waveguides (not shown). The optical waveguide may transmit light generated by the first display 151 and the second display 152 to the user's eyes. The wearable electronic device 100 may include optical waveguides corresponding to the left eye and the right eye, respectively. According to various embodiments, the optical waveguide may be formed of at least one of glass, plastic, or a polymer. According to various embodiments, the optical waveguide may include a nano-pattern, for example, a polygonal or curved grating structure, formed on inner or on outer surface thereof. According to various embodiments, the optical waveguide may include a free-form prism, and in this case, the optical waveguide may provide incident light to a user through a reflective mirror. According to various embodiments, the optical waveguide may include at least one of at least one diffractive element (e.g., a diffractive optical element (DOE) or a holographic optical element (HOE)) or a reflective element (e.g., a reflective mirror) and may guide display light emitted from the light source to the user's eyes by using the at least one diffractive element or the reflective element included in the optical waveguide. According to various embodiments, the diffractive element may include an input/output optical member. According to various embodiments, the reflective element may include a member causing total reflection.

According to various embodiments, the wearable electronic device 100 may include one or more voice input devices 162-1, 162-2, and 162-3, and the one or more voice input devices 162-1, 162-2, and 162-3 may receive a user's voice or a sound generated in the vicinity of the wearable electronic device 100. For example, the one or more voice input devices 162-1, 162-2, and 162-3 may receive the sound generated in the vicinity to transmit the same to the processor (e.g., the processor 320 of FIG. 3) so that the wearable electronic device 100 can provide a speech-to-text (STT) function.

According to various embodiments, one or more supports (e.g., the first support 101, the second support 102) may include a PCB (e.g., the first PCB 170-1 and the second PCB 170-2), one or more sound output devices 163-1 and 163-2, or one or more batteries 135-1 and 135-2. The first PCB 170-1 and the second PCB 170-2 may transmit an electrical signal to elements included in the wearable electronic device 100, such as a first camera 211, a second camera 212, a third camera 213, a display module 250, an audio module 261, and/or a sensor 280, which will be described later with reference to FIG. 2. According to various embodiments, the first PCB 170-1 and the second PCB 170-2 may be flexible printed circuit boards (FPCBs). According to various embodiments, each of the first PCB 170-1 and the second PCB 170-2 may include a first substrate, a second substrate, and an interposer disposed between the first substrate and the second substrate. According to various embodiments, the wearable electronic device 100 may include batteries 135-1 and 135-2. The batteries 135-1 and 135-2 may store power for operating elements of the wearable electronic device 100. According to various embodiments, the one or more sound output devices 163-1 and 163-2 may output audio data to a user. For example, feedback on a user's command (or input) may be provided or information on a virtual object may be provided to the user via the audio data.

According to various embodiments, the wearable electronic device 100 may include one or more hinges (e.g., a first hinge 103 and a second hinge 104). For example, the first hinge 103 may be configured to couple the first support 101 to the frame 105 and be rotatable with respect to the frame 105, and the second hinge 104 may be configured to couple the second support 102 to the frame 105 and be rotatable with respect to the frame 105.

Figure 2:
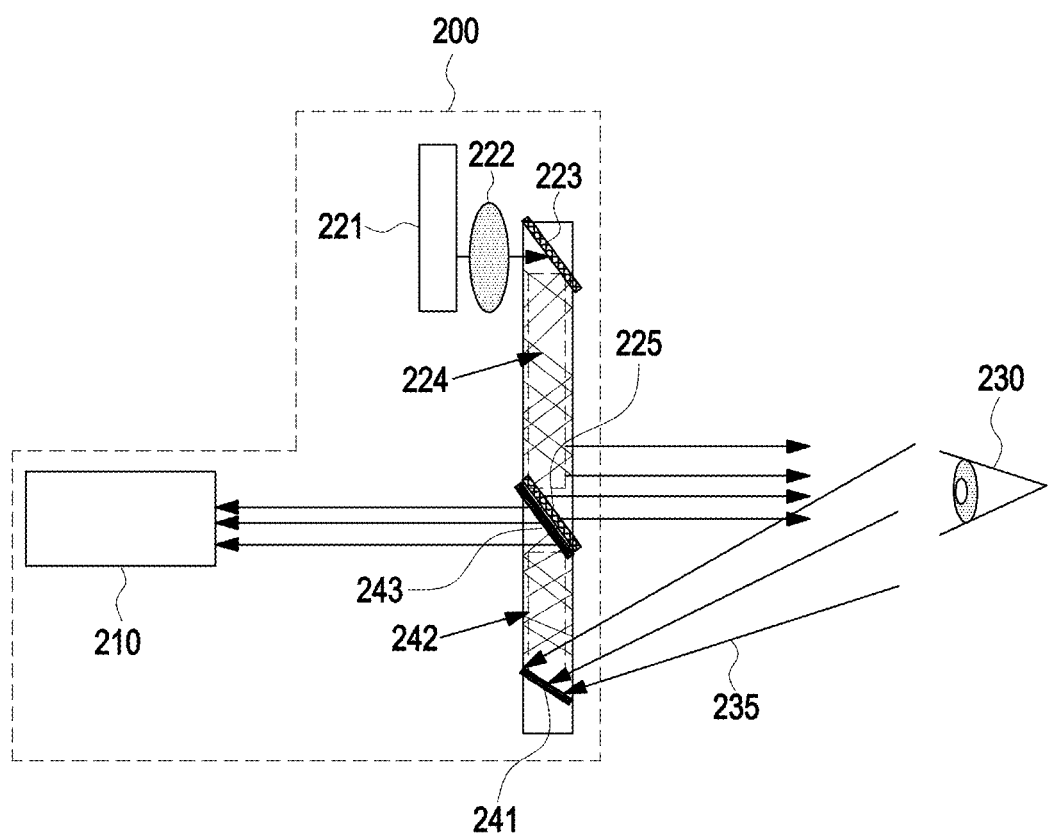
FIG. 2 illustrates structures of an eye tracking camera and a display of a wearable electronic device according to various embodiments.

FIG. 2 illustrates structures of an eye tracking camera and a display of a wearable electronic device according to various embodiments. The wearable electronic device 200 (e.g., the wearable electronic device 100 of FIG. 1) may include a display 221, a projection lens 222, an input optical member 223, a display optical waveguide 224, an output optical member 225, an eye tracking camera 210, a first splitter 241, an eye tracking optical waveguide 242, and/or a second splitter 243.

In the wearable electronic device 200, the display 221 may be the first display 151 or the second display 152 illustrated in FIG. 1. Light output from the display 221 may be refracted by the projection lens 222 to converge into a smaller aperture region. The light refracted by the projection lens 222 may pass through the input optical member 223 (e.g., the input optical members 153-1 and 153-2 of FIG. 1) to be incident to the display optical waveguide 224 and may pass through the display optical waveguide 224 to be output through the output optical member 225. The light output from the output optical member 225 may become visible to the user's eye 230. Hereinafter, the expression "displaying an object on a display" in the specification may mean that light output from the display 221 is output through the output optical member 225 and a shape of an object is seen by the user's eye 230 by means of the light output through the output optical member 225. In addition, the expression "control the display to display an object" may mean that light output from the display 221 is output through the output optical member 225 and the display 221 is controlled such that a shape of an object is seen by the user's eye 230 by means of the light output through the output optical member 225.

Light 235 reflected from the user's eye 230 may pass through the first splitter 241 to be incident to the eye tracking optical waveguide 242 and may pass through the eye tracking optical waveguide 242 to be output to the eye tracking camera 210 through the second splitter 243. According to various embodiments, the light 235 reflected from the user's eye 230 may be light which is output from the light emitting elements 114-1 and 114-2 of FIG. 1 and reflected from the user's eye 230. According to various embodiments, the eye tracking camera 210 may be one or more second cameras 112-1 and 112-2 shown in FIG. 1.

Figure 3:
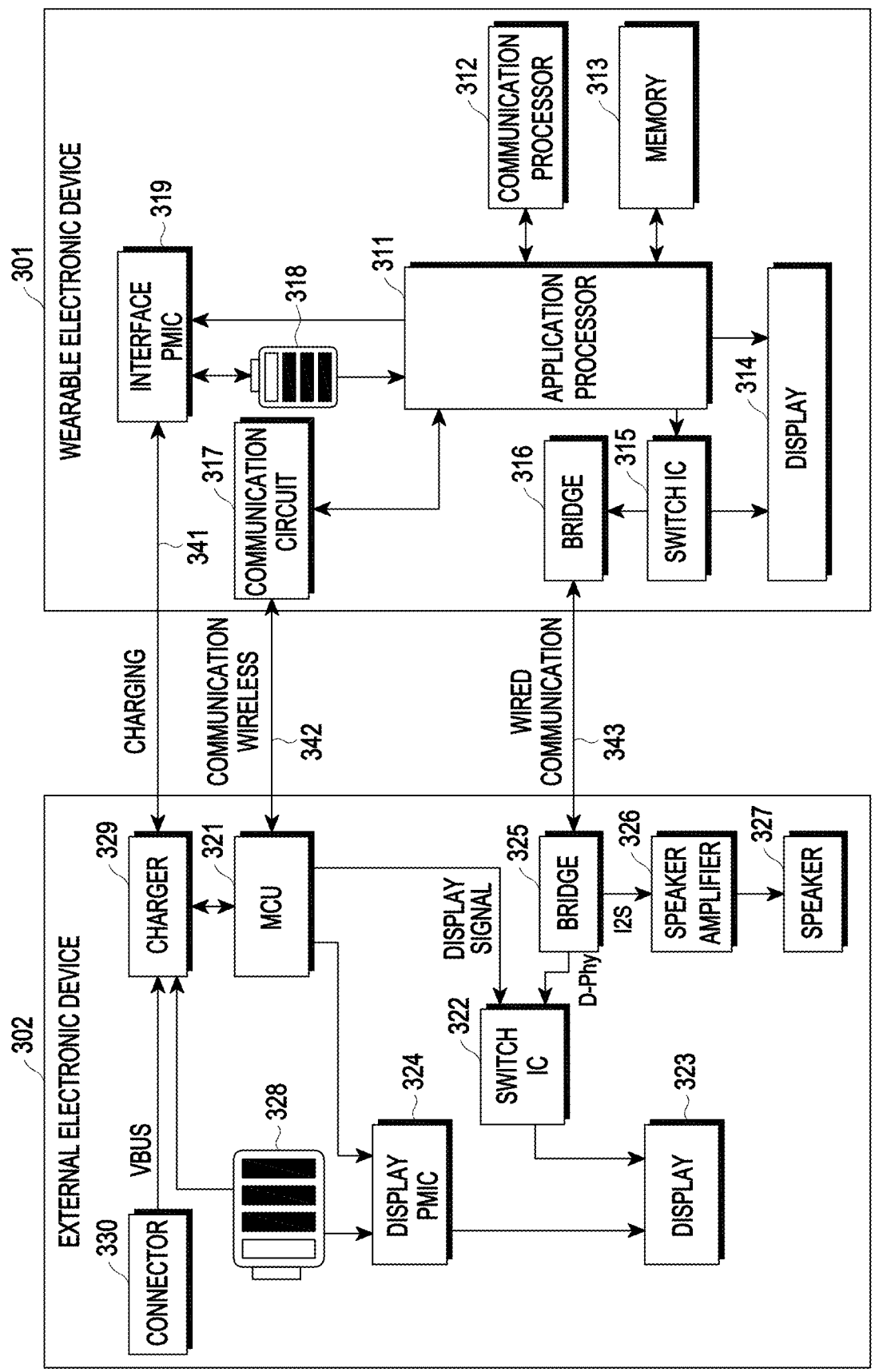
FIG. 3 is a block diagram of a wearable electronic device and an external electronic device according to various embodiments.

FIG. 3 is a block diagram of a wearable electronic device and an external electronic device according to various embodiments.

Referring to FIG. 3, the wearable electronic device 301 (e.g., the wearable electronic device 100 of FIG. 1) may include an application processor 311, a communication processor 312, a memory 313, a display 314, a switch integrated circuit (IC) 315, a bridge 316, a communication circuit 317, a battery 318, and/or an interface Power Management Integrated Circuit (PMIC) 319.

The application processor 311 may control at least one other element of the wearable electronic device 301, connected to the application processor 311 by executing software and may perform various data processing or operations.

According to various embodiments, an external electronic device 302 may include an MCU 321, a switch IC 322, a display 323, a display PMIC 324, a bridge 325, a speaker amplifier 326, a speaker 327, a battery 328, a charger 329, and/or a connector 330.

According to various embodiments, the connector 330 may be mechanically connected to or brought into contact with a connector (not shown) of the wearable electronic device 301. When the connector 330 is connected to or brought into contact with the connector of the wearable electronic device 301, the charger 329 may be connected to the interface PMIC 319, and the charger 329 may charge 341 the battery 318 through the interface PMIC 319 of the wearable electronic device 301, based on the power of the battery 328. According to various embodiments, when the connector 330 is connected to or brought into contact with the connector of the wearable electronic device 301, the interface PMIC 319 may charge the battery 328 through the charger 329, based on the power of the battery 318.

According to various embodiments, the communication circuit 317 may establish a wireless communication connection 342 with the MCU 321. According to various embodiments, the wireless communication connection 342 may be a Bluetooth connection or a Wi-Fi connection. According to various embodiments, the type of the wireless communication connection 342 is not limited. As will be described later with reference to FIG. 5, the wearable electronic device 301 may transmit data to the external electronic device 302 and receive data from the external electronic device 302 via the wireless communication connection 342.

According to various embodiments, the wearable electronic device 301 may establish a wired communication connection 343 with the external electronic device 302 through the switch IC 315, the bridge 316, and the bridge 325 of the external electronic device 302. According to various embodiments, when the connector (not shown) of the wearable electronic device 301 is mechanically connected to the connector 330, wired communication may be performed between the wearable electronic device 301 and the external electronic device 302.

According to various embodiments, sound data may be transmitted from the wearable electronic device 301 to the external electronic device 302 via the wired communication connection 343. The bridge 325 may transmit sound data (I2S) to the speaker amplifier 326, and the speaker amplifier 326 may control the speaker 327 such that a sound is output based on the sound data. According to various embodiments, the sound data may be data based on an integrated interchip sound (I2S) standard.

According to various embodiments, screen data may be transmitted from the wearable electronic device 301 to the external electronic device 302 via the wired communication connection 343. The bridge 325 may transmit the screen data to the display 323 via the switch IC 322, and the display 323 may display a screen based on the screen data. According to various embodiments, the screen data may be data based on the D-PHY standard. In one embodiment, the switch IC 322 may selectively change an electrical path connected to the display 323, based on the states of the wearable electronic device 301 and the external electronic device 302 with respect to the display 323. For example, in a case of the wired communication connection 343 between the wearable electronic device 301 and the external electronic device 302, the switch IC 322 may electrically connect the bridge 325 to the display 323. As another example, in a case other than the wired communication connection 343 between the wearable electronic device 301 and the external electronic device 302, the switch IC 322 may electrically connect the microcontroller unit (MCU) 321 to the display 323.

Although not shown in FIG. 3, according to various embodiments, the wearable electronic device 301 may include at least one sensor such as an acceleration sensor and/or a gyro sensor. Although not shown in FIG. 3, according to various embodiments, at least one of the wearable electronic device 301 or the external electronic device 302 may include a magnet, and the wearable electronic device 301 and the external electronic device 302 may be attached to each other by the magnet. Although not shown in FIG. 3, according to various embodiments, the external electronic device 302 may include at least one sensor.

Figure 4A:
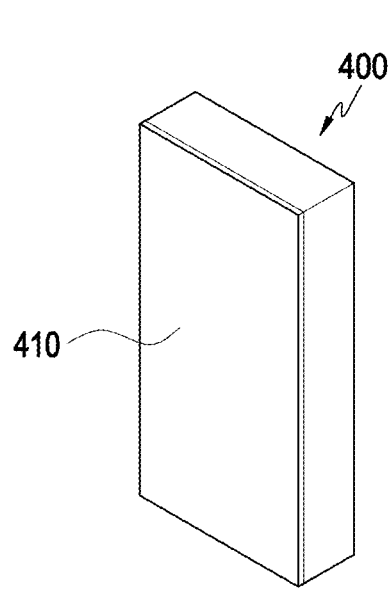
FIGS. 4A, 4B, and 4C illustrate the exterior of an external electronic device configured to accommodate a wearable electronic device according to various embodiments.
Figure 4B:
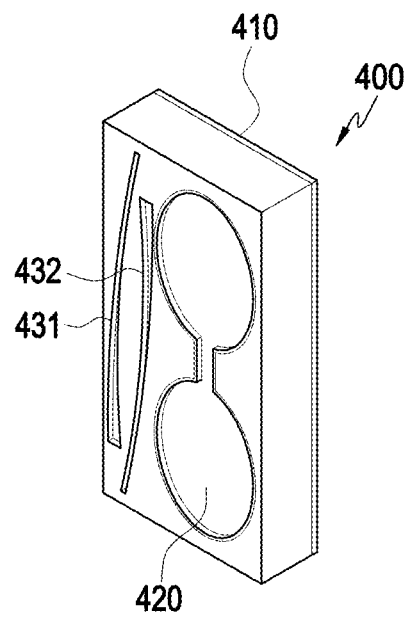
Figure 4C:
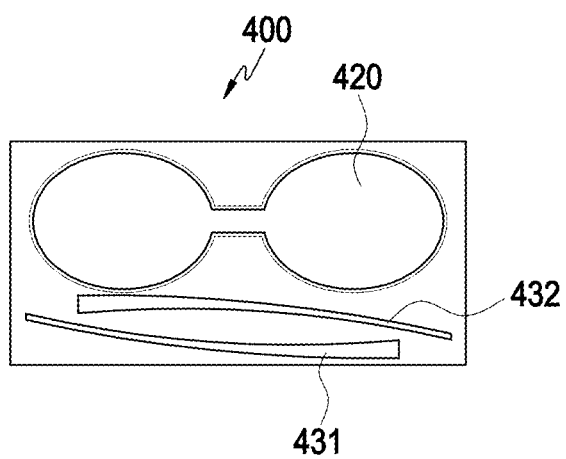

FIGS. 4A to 4C illustrate the exterior of an external electronic device configured to accommodate a wearable electronic device according to various embodiments.

Referring to FIG. 4A, a display 410 may be positioned on one surface of an external electronic device 400 (e.g., the external electronic device 302 of FIG. 3). Referring to FIGS. 4B and 4C, the external electronic device 400 may include spaces 431, 432, and 420 which can accommodate separated parts of the wearable electronic device, respectively.

According to various embodiments, the expression that the spaces 431, 432, and 420 can accommodate the parts of the wearable electronic device does not necessarily mean that the parts of the wearable electronic device are fully located within the spaces 431, 432, and 420 or that the parts of the wearable electronic device are completely encapsulated by the external electronic device 400. According to various embodiments, when it is said that the spaces 431, 432, and 420 can accommodate the parts of the wearable electronic device, that may represent that at least portions of the separated parts of the wearable electronic device are located within the spaces 431, 432, and 420.

Although FIGS. 4A to 4C illustrate that the external electronic device 400 includes the plurality of spaces 431, 432, and 420 configured to separately accommodate the parts of the wearable electronic device, according to various embodiments, the external electronic device may be designed to integrally accommodate the wearable electronic device.

Figure 5:
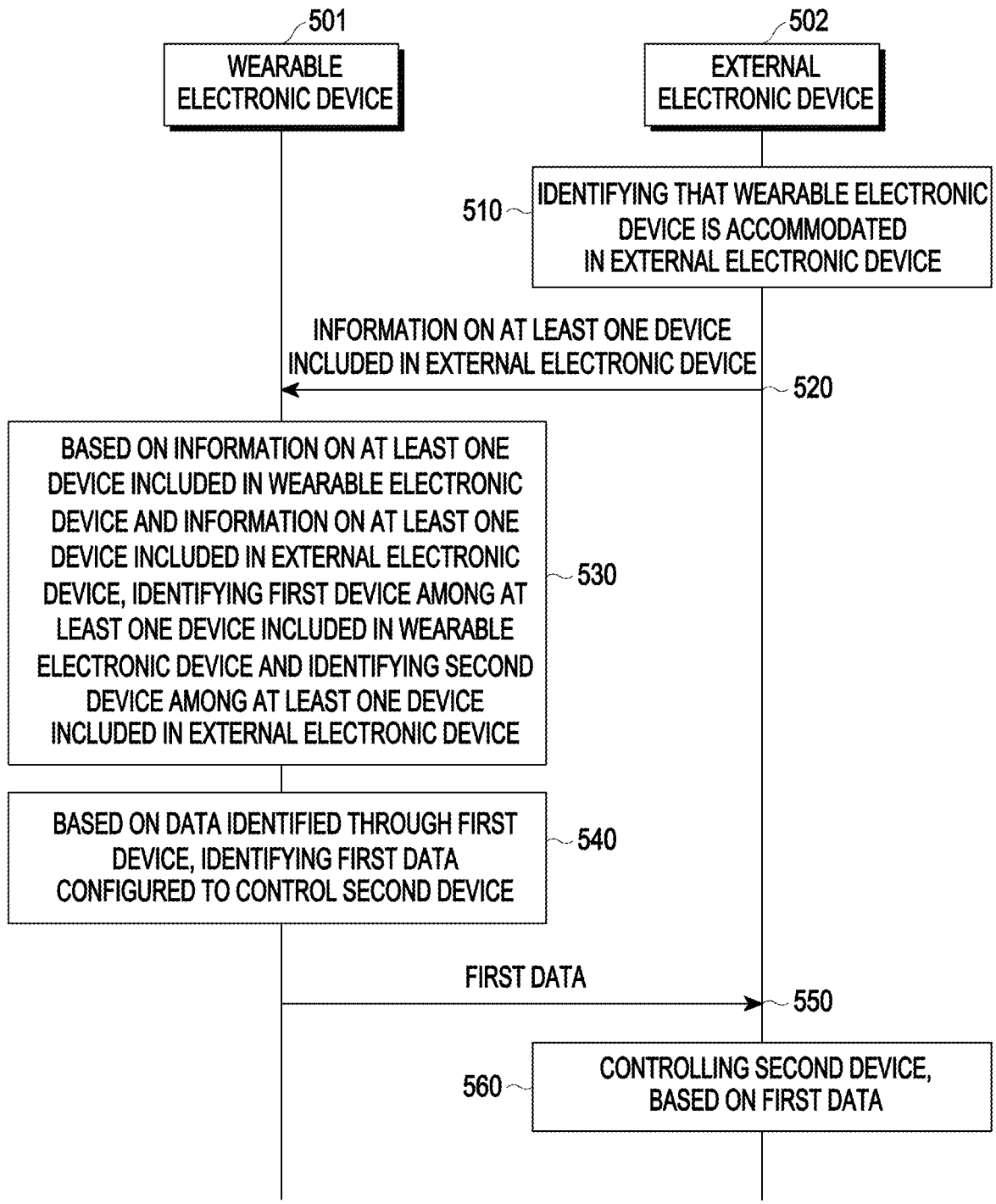
FIG. 5 illustrates operations performed by a wearable electronic device and an external electronic device according to various embodiments.

FIG. 5 illustrates operations performed by a wearable electronic device and an external electronic device according to various embodiments.

In operation 510, the external electronic device 502 (e.g., the external electronic device 302) may identify that the wearable electronic device 501 (e.g., the wearable electronic device 301) is accommodated in the external electronic device 502. Although FIG. 5 illustrates that the external electronic device 502 identifies that the wearable electronic device 501 is accommodated in the external electronic device 502, according to various embodiments, the wearable electronic device 501 may also identify that the wearable electronic device 501 is accommodated in the external electronic device 502.

According to various embodiments, at least one of the wearable electronic device 501 or the external electronic device 502 may include a magnet. At least one of the wearable electronic device 501 and the external electronic device 502 may identify through a sensor built therein that the wearable electronic device 501 and the external electronic device 502 are attached to each other by the magnet, thereby identifying that the wearable electronic device 501 is accommodated in the external electronic device 502.

According to various embodiments, the external electronic device 502 may identify that the wearable electronic device 501 is accommodated in the external electronic device 502, in response to connection or contact between a connector of the wearable electronic device 501 and a connector (e.g., the connector 330) configured to support a wired communication connection. According to various embodiments, the wearable electronic device 501 may include a connector configured to support a wired communication connection and may identify that the wearable electronic device 501 is accommodated in the external electronic device 502, in response to connection between the connector and the connector 330 of the external electronic device 502.

According to various embodiments, the external electronic device 502 may establish a short-range wireless communication connection with the wearable electronic device 501 and may identify that the wearable electronic device 501 is accommodated in the external electronic device 502, based on a signal transmitted and received through the short-range wireless communication connection. According to various embodiments, the wearable electronic device 501 may establish a short-range wireless communication connection with the external electronic device 502 and may identify that the wearable electronic device 501 is accommodated in the external electronic device 502, based on a signal transmitted and received through the short-range wireless communication connection.

According to various embodiments, after at least one of the wearable electronic device 501 or the external electronic device 502 identifies that the wearable electronic device 501 is accommodated in the external electronic device 502, information indicating that the wearable electronic device 501 is accommodated in the external electronic device 502 may be transmitted to the counterpart.

According to various embodiments, the expression that the wearable electronic device 501 is accommodated in the external electronic device 502 does not necessarily mean that the entire wearable electronic device 501 is fully positioned inside the external electronic device 502 or that the wearable electronic device is not completely encapsulated by the external electronic device 502. According to various embodiments, the expression that the wearable electronic device 501 is accommodated in the external electronic device 502 may represent that at least a portion of the wearable electronic device 501 is accommodated in the external electronic device 502.

In operation 520, the external electronic device 502 may transmit information on at least one device included in the external electronic device 502 to the wearable electronic device 501, in response to identifying that the wearable electronic device 501 is accommodated in the external electronic device 502. According to various embodiments, the information may be transmitted via a wired communication connection and/or a wireless communication connection.

According to various embodiments, the external electronic device 502 may transmit information indicating at least one of a format, a resolution, or a size in which an image is displayed on a display (e.g., the display 323) included in the external electronic device 502 to the wearable electronic device 501. According to various embodiments, the external electronic device 502 may transmit information indicating a specification of a speaker (e.g., the speaker 327) included in the external electronic device 502 to the wearable electronic device 501. According to various embodiments, the external electronic device 502 may transmit information indicating the types and/or performance of sensors included in the external electronic device to the wearable electronic device 501.

According to various embodiments, the wearable electronic device 501, having identified that the wearable electronic device 501 is accommodated in the external electronic device 502, may request information on at least one device included in the external electronic device 502 from an external electronic device 502. The external electronic device 502 may transmit information on the at least one device included in the external electronic device 502 to the wearable electronic device 501, based on the request from the wearable electronic device 501.

In operation 530, the wearable electronic device 501 may identify a first device among at least one device included in the wearable electronic device 501 and a second device among at least one device included in the external electronic device 502, based on information on the at least one device included in the wearable electronic device 501 and information on the at least one device included in the external electronic device 502. According to various embodiments, the first device and the second device may interact with each other to form an extended system.

According to various embodiments, information on at least one device included in the wearable electronic device 501 may include information on an application being executed in the application processor 311 of the wearable electronic device 501. The information on an application may include, for example, whether the application supports execution screen display on the display 323 of the external electronic device 502. For example, the wearable electronic device 501 may identify based on information on an application that the application supports execution screen display on a flat display having the size of the display 323, and based on this, the wearable electronic device may identify the application processor 311 of the wearable electronic device 501 as a first device and the display 323 of the external electronic device 502 as a second device.

According to various embodiments, the wearable electronic device 501 may identify the battery 318 as the first device and may identify the display 323 and/or the speaker 327 of the external electronic device 502 as the second device.

According to various embodiments, the wearable electronic device 501 may identify the application processor 311 of the wearable electronic device 501 as the first device and the speaker 327 of the external electronic device 502 as the second device.

According to various embodiments, each of the first device and the second device is not limited to a single device. According to various embodiments, as long as the first device and the second device can form an extended system as a whole through interaction therebetween, a plurality of other devices may be identified as the first device or the second device. For example, the wearable electronic device 501 may identify the application processor 311 of the wearable electronic device 501 as the first device and the speaker 327 and the display 323 of the external electronic device 502 as a second device.

In another example, the wearable electronic device 501 may identify at least one of an acceleration sensor or a gyro sensor of the wearable electronic device 501 and the application processor 311, as a first device and identify the display 323 of the external electronic device 502 as the second device.

In operation 540, the wearable electronic device 501 may identify first data configured to control the second device, based on data identified through the first device.

According to various embodiments, based on the identification that the application being executed in the application processor 311 of the wearable electronic device 501 supports execution screen display on the display 323 of the external electronic device 502, when the application processor 311 of the wearable electronic device 501 is identified as the first device and the display 323 of the external electronic device 502 is identified as the second device, the first data may represent an execution screen of the application configured to be displayed on the display 323 of the external electronic device 502.

According to various embodiments, when the battery 318 is the first device and the display 323 and/or the speaker 327 of the external electronic device 502 is the second device, the first data may represent information related to the state of the battery 318 to be visually displayed on the display 232 or represent information related to the state of the battery 318 as sound data configured to be output from the speaker 327. According to various embodiments, the information related to the state of the battery 318 may include at least one of remaining battery, expected residual time, or a temperature of the battery 318.

According to various embodiments, when the application processor 311 of the wearable electronic device 501 is the first device and the speaker 327 of the external electronic device 502 is the second device, the first data may include sound data configured to be output through the speaker 327.

According to various embodiments, when the application processor 311 of the wearable electronic device 501 is the first device and the speaker 327 and the display 323 of the external electronic device 502 are the second device, the first data may include sound data configured to be output through the speaker 327 and data representing an interface configured to control sound output configured to be displayed on the display 323.

According to various embodiments, when at least one of an acceleration sensor or a gyro sensor of the wearable electronic device 501 and the application processor 311 are a first device, and the display 323 of the external electronic device 502 is the second device, the wearable electronic device 501 may identify whether to display on the display 323 a screen of the application executed in the application processor 311 in a horizontal direction or a vertical direction, based on data obtained through the at least one of the acceleration sensor or the gyro sensor, and the first data may represent an execution screen of the application configured to be displayed in the identified direction.

In operation 550, the wearable electronic device 501 may transmit first data to the external electronic device 502. According to various embodiments, the wearable electronic device 501 may transmit the first data to the external electronic device 502 via wireless communication or wired communication.

In operation 560, the external electronic device 502 may control the second device, based on the first data. According to various embodiments, when the display 323 is included in the second device and the first data represents an execution screen of an application, the external electronic device 502 may display a screen based on the first data on the display 323. According to various embodiments, when the speaker 327 is included in the second device and the first data includes sound data, the external electronic device 502 may output a sound based on the first data through the speaker 327. According to various embodiments, when the display 323 is included in the second device and the first data includes data representing an interface, the external electronic device 502 may display the interface on the display 323.

In operations 530 to 560 of FIG. 5, as an example, the second device is illustrated as being controlled based on data identified through the first device. However, according to various embodiments, a manner by which at least a portion of the first device and at least a portion of the second device influence each other is not limited. According to various embodiments, in operation 530, the wearable electronic device 501 may be configured to receive second data from the external electronic device 502, based on part of the second device and identify the first data, based on at least part of the second data. For example, the wearable electronic device 501 may identify the application processor 311 of the wearable electronic device 501 as the first device, may identify the sensor and the display 323 of the external electronic device 502 as the second device, may receive second data based on a measurement value through the sensor of the external electronic device 502 from the external electronic device 502, and may transmit, as the first data, information on an execution screen of an application derived using the second data from the application being executed in the application processor 311 to the external electronic device 502.

Figure 6:
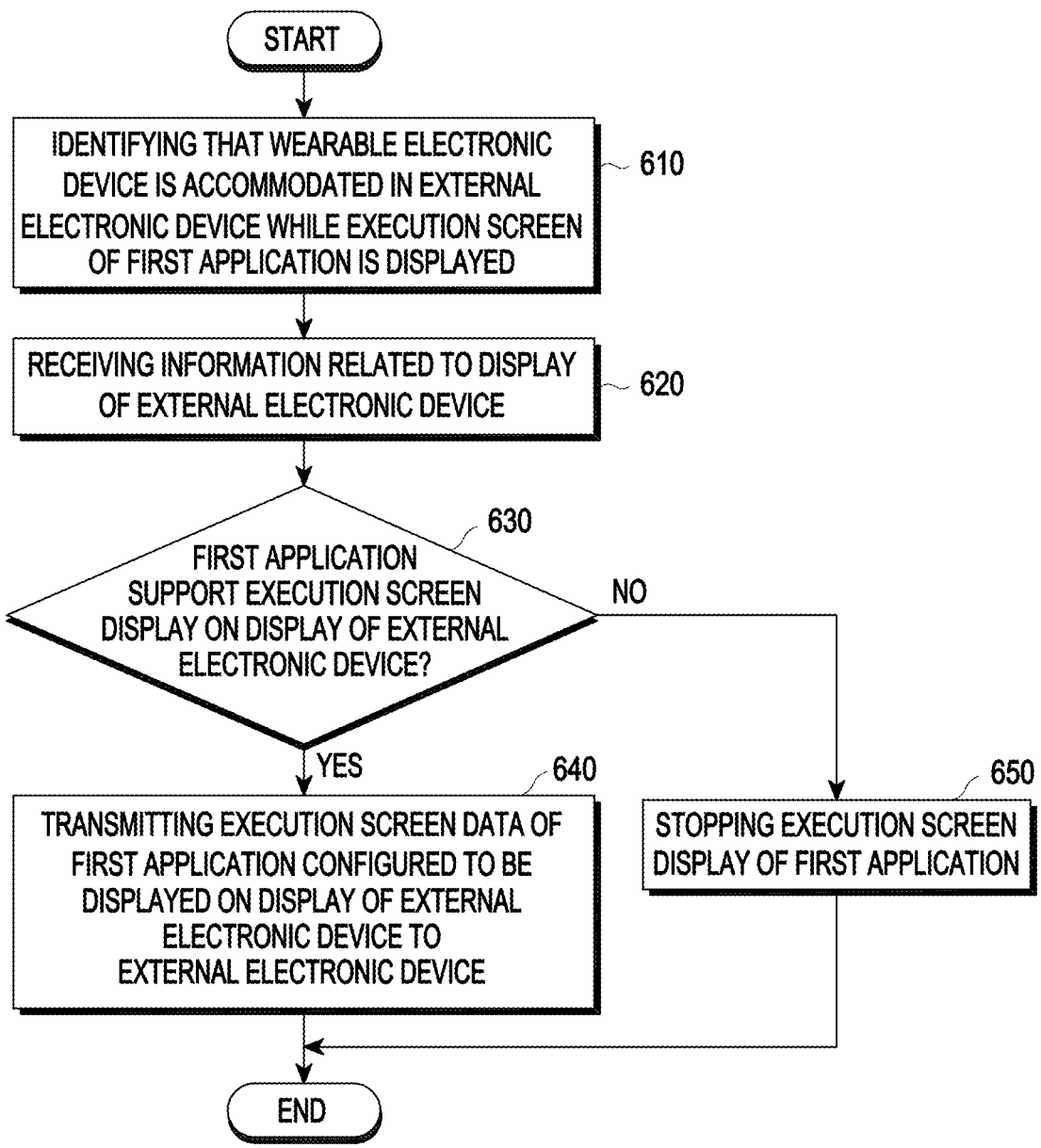
FIG. 6 illustrates operations performed by a wearable electronic device according to various embodiments.

FIG. 6 illustrates operations performed by a wearable electronic device according to various embodiments. In operation 610, the wearable electronic device (e.g., the at least one processor 311 or 312 of the wearable electronic device 301) may identify that the wearable electronic device 301 is accommodated in the external electronic device (e.g., the external electronic device 302) while an execution screen of a first application is being displayed on the display (e.g., the display 314). A method of identifying that the wearable electronic device 301 is accommodated in the external electronic device (e.g., the external electronic device 302) has been described above with reference to operation 510 of FIG. 5.

In operation 620, the at least one processor 311 or 312 may receive information on the display 323 of the external electronic device 302 from the external electronic device 302, in response to identifying that the wearable electronic device 301 is accommodated in the external electronic device 302. According to various embodiments, the at least one processor 311 or 312 may request information on the display 323 from the external electronic device 302, in response to identifying that the wearable electronic device 301 is accommodated in the external electronic device 302 and may receive, as a response to the request, the information on the display 323 from the external electronic device 302.

In operation 630, the at least one processor 311 or 312 may identify whether the first application supports execution screen display on the display 323 of the external electronic device 302.

When it is identified in operation 630 that the first application supports display of the execution screen on the display 323 of the external electronic device 302, the at least one processor 311 or 312 may transmit execution screen data of the first application configured to be displayed on the display 323 to the external electronic device 302, in operation 640. The external electronic device 302 may display the execution screen of the first application on the display 323, based on the execution screen data. Therefore, even if the wearable electronic device 301 is accommodated in the external electronic device 302, a user may continue to use the first application through the display 323 of the external electronic device 302. According to various embodiments, the at least one processor 311 or 312 may stop displaying the execution screen of the first application on the display 314 in operation 640.

When it is identified in operation 630 that the first application does not support the execution screen display on the display 323 of the external electronic device 302, the at least one processor 311 or 312 may stop displaying the execution screen of the first application on the display 314, in operation 650. When the wearable electronic device 301 is accommodated in the external electronic device 302, since it is difficult for the user to use the first application through the display 314 of the wearable electronic device 301, and the first application cannot be used even through the display 323 of the external electronic device 302, the at least one processor 311 or 312 may stop displaying the execution screen of the first application on the display 314. According to various embodiments, the at least one processor 311 or 312 may end execution of the first application in operation 650. According to various embodiments, the at least one processor 311 or 312 may stop displaying the execution screen of the first application on the display 314 without terminating the execution of the first application in operation 650.

Figure 7:
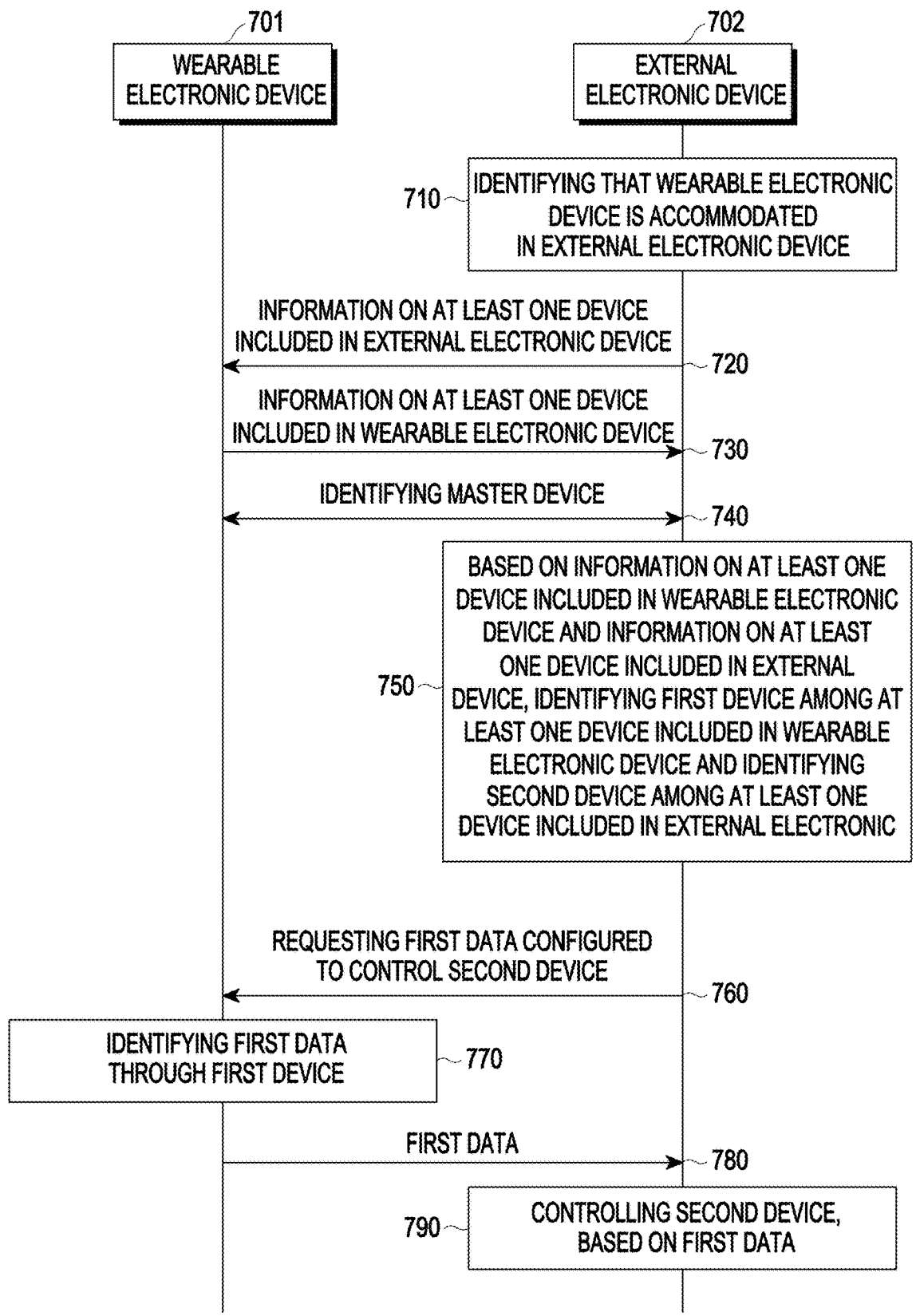
FIG. 7 illustrates operations performed by a wearable electronic device and an external electronic device according to various embodiments.

FIG. 7 illustrates operations performed by a wearable electronic device and an external electronic device according to various embodiments.

In operation 710, the external electronic device 702 (e.g., the MCU 321 of the external electronic device 302) may identify that the wearable electronic device 701 (e.g., the wearable electronic device 301) is accommodated in the external electronic device 702. Details related to operation 510 may be equally applied to operation 710.

In operation 720, the external electronic device 702 may transmit information on at least one device included in the external electronic device 702 to the wearable electronic device 701. Details related to operation 520 may be substantially applied identically to operation 720.

In operation 730, the wearable electronic device 701 may transmit information on at least one device included in the wearable electronic device 701 to the external electronic device 702.

In operation 740, the wearable electronic device 701 and the external electronic device 702 may identify which of the wearable electronic device 701 and the external electronic device 702 will become a master device. According to various embodiments, the wearable electronic device 701 and the external electronic device 702 may identify which will become the master device through negotiation. According to various embodiments, the wearable electronic device 701 and the external electronic device 702 may identify the device having superior processing performance as the master device.

When the external electronic device 702 is identified as the master device, in operation 750, the external electronic device 702 may identify a first device among at least one device included in the wearable electronic device 701 and a second device among at least one device included in the external electronic device 702, based on information on the at least one device included in the wearable electronic device 701 and information on the at least one device included in the external electronic device 702. An example of selecting the first device and the second device has been described above with reference to operation 530 of FIG. 5.

In operation 760, the external electronic device 702 may request the wearable electronic device 701 for first data configured to control the second device. An example of the first data has been described above with reference to operation 540 of FIG. 5.

The wearable electronic device 701 may identify first data through the first device in operation 770, based on the request for the first data and may transmit the first data to the external electronic device 702 in operation 780. The external electronic device 702 may control the second device, based on the first data. Details related to operation 560 of FIG. 5 may be substantially applied identically to operation 790.

Although not shown in FIG. 7, according to various embodiments, in operation 740, the wearable electronic device 701 and the external electronic device 702 may identify the wearable electronic device 701 as a master device. In this case, the external electronic device 702 may not perform operations 750 and 760. Instead, operation 530 may be performed by the wearable electronic device 701.

Although not shown in FIG. 7, according to various embodiments, when the wearable electronic device 701 is not accommodated in the external electronic device 702, the external electronic device 702 may establish wireless communication with the wearable electronic device 701 and may operate as an input auxiliary device of the wearable electronic device 701. For example, the external electronic device 702 may transmit information on a user input made on the external electronic device 702 to the wearable electronic device 701. According to various embodiments, the display 323 of the external electronic device 702 may be a touch screen display, may display an interface for an input on the touch screen display, and may detect a user input. According to various embodiments, the external electronic device 702 may include a physical button and detect a user input through the physical button. According to various embodiments, the external electronic device 702 may include a fingerprint sensor and detect a user's fingerprint input through the fingerprint sensor. According to various embodiments, the external electronic device 702 may include a motion sensor such as an acceleration sensor and/or a gyro sensor and may detect a movement of the external electronic device 702, caused by a user, through the motion sensor.

According to various embodiments, a wearable electronic device (e.g., the wearable electronic device 301) accommodatable in an external electronic device (e.g., the external electronic device 302) may include at least one processor (e.g., an application processor 311, and a communication processor 312). The at least one processor 311 or 312 may be configured to identify that the wearable electronic device 301 is accommodated in the external electronic device 302, receive information on at least one device included in the external electronic device 302 from the external electronic device 302, in response to identifying that the wearable electronic device 301 is accommodated in the external electronic device 302, based on information on at least one device included in the wearable electronic device 301 and the information on the at least one device included in the external electronic device 302, identify a first device among the at least one device included in the wearable electronic device 301 and identify a second device among the at least one device included in the external electronic device 302, based on data obtained through the first device, identify first data configured to control the second device, and transmit the first data to the external electronic device 302.

According to various embodiments, the at least one processor 311 or 312 may be configured to identify a master device among the wearable electronic device 301 and the external electronic device 302 and identify the first device and the second device, based on identification that the wearable electronic device 301 is the master device.

According to various embodiments, the information on the at least one device included in the wearable electronic device 301 may include information on a first application executed by an application processor 311 of the wearable electronic device 301, the information on the at least one device included in the external electronic device 302 may include information on a display of the external electronic device 302, based on identification that an execution screen of the first application is capable of being displayed on the display of the external electronic device 302, the at least one processor 311 or 312 may be configured to identify the application processor 311 as the first device and identify the display of the external electronic device 302 as the second device, and the first data may represent an execution screen of the first application configured to be displayed on the display of the external electronic device 302.

According to various embodiments, the first device may further include at least one of an acceleration sensor or a gyro sensor of the wearable electronic device 301, and the at least one processor 311 or 312 may be configured to identify the first data so as to indicate a horizontal execution screen of the first application or indicate a vertical execution screen of the first application, based on data obtained through at least one of the acceleration sensor or the gyro sensor.

According to various embodiments, the at least one processor 311 or 312 may be configured to identify, based on information on at least one device included in the wearable electronic device 301 and information on at least one device included in the external electronic device 302, a third device among the at least one device included in the external electronic device 302, receive second data identified based on the third device from the external electronic device 302, and identify the first data based on the second data.

According to various embodiments, the at least one processor 311 or 312 may identify a battery of the wearable electronic device 301 as the first device, and the first data may represent information related to the battery.

According to various embodiments, the at least one processor 311 or 312 may be configured to identify the application processor 311 as the first device and identify a speaker 327 of the external electronic device 302 as the second device, and the first data may include sound data configured to be output through the speaker 327.

According to various embodiments, at least one of the wearable electronic device 301 or the external electronic device 302 may include a magnet. The at least one processor 311 or 312 may be configured to identify that the wearable electronic device 301 is accommodated in the external electronic device 302, in response to identifying that the wearable electronic device 301 and the external electronic device 302 are attached to each other by the magnet.

According to various embodiments, the wearable electronic device 301 may include a connector configured to support a wired communication connection, and the at least one processor 311 or 312 may be configured to identify that the wearable electronic device 301 is accommodated in the external electronic device 302, in response to connection between the external electronic device 302 and the connector, and transmit the first data to the external electronic device 302 via the wired communication connection.

According to various embodiments, the at least one processor 311 or 312 may be configured to establish a short-range wireless communication connection with the wearable electronic device 301 and identify that the wearable electronic device 301 is accommodated in the external electronic device 302, based on the wireless communication connection.

According to various embodiments, an electronic device (e.g., the external electronic device 302) configured to accommodate a wearable electronic device (e.g., the wearable electronic device 301) may include at least one processor (e.g., the MCU 321), and the at least one processor 321 may be configured to identify that the wearable electronic device 301 is accommodated in the electronic device 302, receive information on at least one device included in the wearable electronic device 301 from the wearable electronic device 301, in response to identifying that the wearable electronic device 301 is accommodated in the external electronic device 302, based on the information on the at least one device included in the wearable electronic device 301 and information on at least one device included in the electronic device 302, identify a first device among the at least one device included in the wearable electronic devices 301 and identify a second device among the at least one device included in the electronic device 302, receive, from the wearable electronic device 301, first data identified based on data obtained through the first device, and control the second device, based on the first data.

According to various embodiments, the at least one processor 321 may be configured to identify a master device among the wearable electronic device 301 and the electronic device 302 and identify the first device and the second device, based on identification that the electronic device 302 is the master device.

According to various embodiments, the at least one processor 321 may be configured to transmit information on a user input made to the electronic device 302 to the wearable electronic device 301, based on identification that the wearable electronic device 301 is not accommodated in the electronic device 302.

According to various embodiments, a method performed by a wearable electronic device (e.g., the wearable electronic device 301) may include identifying that the wearable electronic device 301 is accommodated in an external electronic device (e.g., external electronic device 302), receiving information on at least one device included in the external electronic device 302 from the external electronic device 302, in response to identifying that the wearable electronic device 301 is accommodated in the external electronic device 302, based on information on at least one device included in the wearable electronic device 301 and the information at least one device included in the external electronic device 302, identifying a first device among the at least one device included in the wearable electronic device 301 and identifying a second device among the at least one device included in the external electronic device 302, identifying first data configured to control the second device, based on data obtained through the first device, and transmitting the first data to the external electronic device 302.

According to various embodiments, the method may further include identifying a master device among the wearable electronic device 301 and the external electronic device 302, and the identifying the first device and the second device may be performed based on identification that the wearable electronic device 301 is the master device.

According to various embodiments, the information on the at least one device included in the wearable electronic device 301 may include information on a first application executed by an application processor 311 of the wearable electronic device 301, the information on the at least one device included in the external electronic device 302 may include information on a display 323 of the external electronic device 302, the identifying the first device and the second device may include, based on identification that an execution screen of the first application is capable of being displayed on the display 323 of the external electronic device 302, identifying the application processor 311 as the first device and identifying the display 323 of the external electronic device 302 as the second device, and the first data may represent the execution screen of the first application configured to be displayed on the display 323 of the external electronic device 302.

According to various embodiments, the first device may further include at least one of an acceleration sensor or a gyro sensor of the wearable electronic device 301, and the identifying the first data may include identifying the first data so as to indicate a horizontal execution screen of the first application or indicate a vertical execution screen of the first application, based on data obtained through the at least one of the acceleration sensor or the gyro sensor.

According to various embodiments, the method may further include identifying, based on information on at least one device included in the wearable electronic device 301 and information on at least one device included in the external electronic device 302, a third device among the at least one device included in the external electronic device 302, and receiving, from the external electronic device 302, second data identified based on the third device, and the identifying the first data may be performed based on the second data.

According to various embodiments, the identifying the first device may include identifying a battery 318 of the wearable electronic device 301 as the first device, and the first data may represent information related to the battery 318.

According to various embodiments, the identifying the first device and the second device may include identifying an application processor 311 of the wearable electronic device 301 as the first device and identifying a speaker 327 of the external electronic device 302 as the second device, and the first data may include sound data configured to be output through the speaker 327.

The electronic device according to various embodiments disclosed in this document may include various types of devices. The electronic device may include, for example, a portable communication device (e.g., a smartphone), a computer device, a portable multimedia device, a portable medical device, a camera, a wearable device, or a home appliance device. The electronic device according to the embodiment of the document is not limited to the above-described devices.

The various embodiments of this document and the terms used therein are not intended to limit the technical features described in this document to specific embodiments, but it should be understood to include various modifications, equivalents, or substitutions of the embodiments. In connection with the description of the drawings, like reference numerals may be used for similar or related elements. The singular form of the noun corresponding to an item may include one or more of the item, unless the relevant context clearly dictates otherwise. As used herein, "A or B", "at least one of A and B", "at least one of A or B", "A, B, or C", "at least one of A, B, and C", and "A, B, or C" each may include any one of, or all possible combinations of, items listed together in the corresponding one of the phrases. Terms such as "first", "second", or "first" or "second" may be used simply to distinguish the element from the other elements, and the elements are not limited in other aspects (e.g., importance or order). When it is said that one (e.g., first) element is "coupled" or "connected" to another (e.g., second) component, with or without the terms "functionally" or "communicatively", it means that the one element can be connected to the other element directly (e.g., by wire), wirelessly, or through a third element.

The term "module" used in various embodiments of this document may include a unit implemented in hardware, software, or firmware, and can be used interchangeably with terms such as, for example, logic, logic block, component, or circuit. A module may be an integrally formed component or a minimum unit or a part of the component that performs one or more functions. For example, according to an embodiment, the module may be implemented in the form of an application-specific integrated circuit (A SIC).

According to various embodiments of the document may be implemented as software (e.g., the program) including one or more instructions stored in a storage medium (e.g., memory 313) readable by a machine (e.g., the wearable electronic device 301). For example, the processor (e.g., the application processor 311) of the machine (e.g., the wearable electronic device 301) may call at least one instruction among one or more stored instructions from the storage medium and execute same. This enables the machine to be operated to perform at least one function according to the least one called instruction. The one or more instructions may include code generated by a compiler or code executable by an interpreter. The device-readable storage medium may be provided in the form of a non-transitory storage medium. Here, 'non-transitory' only means that the storage medium is a tangible device and does not contain a signal (e.g., electromagnetic wave), and this term does not distinguish between a case where data is semi-permanently stored in the storage medium and a case where data is temporarily stored therein.

According to one embodiment, the method according to various embodiments disclosed in this document may be included in a computer program product. A computer program product may be traded between sellers and buyers as commodities. The computer program product may be distributed in the form of a machine-readable storage medium (e.g., compact disc read only memory (CD-ROM)) or via an application store (e.g., Play Store™), or may be distributed online (e.g., download or upload), directly between two user devices (e.g., smartphones). In the case of online distribution, at least a part of the computer program product may be temporarily stored or temporarily generated in a machine-readable storage medium, such as a memory of a server of a manufacturer, a server of an application store, or a relay server.

According to various embodiments, each element (e.g., module or program) of the above-described elements may include a singular or a plurality of entities, and specific entities of the plurality of entities may be separately disposed in other elements. According to various embodiments, one or more elements or operations among the above-described corresponding elements may be omitted, or one or more other elements or operations may be added. Alternatively or additionally, a plurality of elements (e.g., a module or a program) may be integrated into one element. In this case, the integrated element may perform one or more functions of each element of the plurality of elements identically or similarly to those performed, prior to the integration, by the corresponding element among the plurality of elements. According to various embodiments, operations performed by a module, program, or other elements may be executed sequentially, in parallel, repeatedly, or heuristically, one or more of the operations may be executed in a different order or be omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A wearable electronic device accommodatable in an external electronic device, the wearable electronic device comprising:
at least one processor,
wherein the at least one processor is configured to:
identify that the wearable electronic device is accommodated in the external electronic device;
receive information on at least one device included in the external electronic device from the external electronic device, in response to identifying that the wearable electronic device is accommodated in the external electronic device;
based on information on at least one device included in the wearable electronic device and the information on the at least one device included in the external electronic device, identify a first device among the at least one device included in the wearable electronic device and identify a second device among the at least one device included in the external electronic device;
based on data obtained through the first device, identify first data configured to control the second device; and
transmit the first data to the external electronic device,
wherein the at least one processor is configured to:
identify a master device among the wearable electronic device and the external electronic device; and
identify the first device and the second device, based on identification that the wearable electronic device is the master device.

2. The wearable electronic device of claim 1, wherein:
the information on the at least one device included in the wearable electronic device comprises information on a first application executed by an application processor of the wearable electronic device, and
the information on the at least one device included in the external electronic device comprises information on a display of the external electronic device,
the at least one processor is configured to, based on identification that an execution screen of the first application is capable of being displayed on the display of the external electronic device, identify the application processor as the first device and identify the display of the external electronic device as the second device; and
the first data represents an execution screen of the first application configured to be displayed on the display of the external electronic device.

3. The wearable electronic device of claim 2, wherein the first device further comprises at least one of an acceleration sensor or a gyro sensor of the wearable electronic device, and
wherein the at least one processor is configured to identify, based on data obtained through the at least one of the acceleration sensor or the gyro sensor, the first data so as to indicate a horizontal execution screen of the first application or indicate a vertical execution screen of the first application.

4. The wearable electronic device of claim 2, wherein the at least one processor is configured to:
identify, based on the information on the at least one device included in the wearable electronic device and the information on the at least one device included in the external electronic device, a third device among the at least one device included in the external electronic device,
receive second data identified based on the third device from the external electronic device, and
identify the first data based on the received second data.

5. The wearable electronic device of claim 1, wherein the at least one processor is configured to identify a battery of the wearable electronic device as the first device, and
wherein the first data represents information related to the battery.

6. The wearable electronic device of claim 1, wherein the at least one processor is configured to:
identify an application processor as the first device and identify a speaker of the external electronic device as the second device, and
wherein the first data comprises sound data configured to be output through the speaker.

7. The wearable electronic device of claim 1, wherein at least one of the wearable electronic device or the external electronic device comprises a magnet, and
wherein the at least one processor is configured to identify that the wearable electronic device is accommodated in the external electronic device, in response to identifying that the wearable electronic device and the external electronic device are attached to each other by the magnet.

8. The wearable electronic device of claim 1, wherein the wearable electronic device comprises a connector configured to support a wired communication connection, and
wherein the at least one processor is configured to:
identify that the wearable electronic device is accommodated in the external electronic device, in response to connection between the external electronic device and the connector, and
transmit the first data to the external electronic device via the wired communication connection.

9. The wearable electronic device of claim 1, wherein the at least one processor is configured to:
establish a wireless communication connection with the external electronic device, and
identify that the wearable electronic device is accommodated in the external electronic device, based on the wireless communication connection.

10. A method performed by a wearable electronic device, the method comprising:
Identifying that the wearable electronic device is accommodated in an external electronic device;
receiving information on at least one device included in the external electronic device from the external electronic device, in response to identifying that the wearable electronic device is accommodated in the external electronic device;
based on information on at least one device included in the wearable electronic device and the information on the at least one device included in the external electronic device, identifying a first device among the at least one device included in the wearable electronic device and identifying a second device among the at least one device included in the external electronic device;
identifying first data configured to control the second device, based on data obtained through the first device; and
transmitting the first data to the external electronic device, and
wherein the method further comprises,
identifying a master device among the wearable electronic device and the external electronic device, and
wherein the identifying of the first device and the second device is performed based on identification that the wearable electronic device is the master device.

11. The method of claim 10, wherein:
the information on the at least one device included in the wearable electronic device comprises information on a first application executed by an application processor of the wearable electronic device;
the information on the at least one device included in the external electronic device comprises information on a display of the external electronic device;
the identifying of the first device and the second device comprises, based on identification that an execution screen of the first application is capable of being displayed on the display of the external electronic device, identifying the application processor as the first device and identifying the display of the external electronic device as the second device; and
the first data represents the execution screen of the first application configured to be displayed on the display of the external electronic device.

12. The method of claim 11, wherein the first device further comprises at least one of an acceleration sensor or a gyro sensor of the wearable electronic device, and
wherein the identifying the first data comprises identifying, based on data obtained through the at least one of the acceleration sensor or the gyro sensor, the first data so as to indicate a horizontal execution screen of the first application or indicate a vertical execution screen of the first application.

13. The method of claim 11, wherein the method further comprises,
identifying, based on the information on the at least one device included in the wearable electronic device and the information on the at least one device included in the external electronic device, a third device among the at least one device included in the external electronic device, and
receiving, from the external electronic device, second data identified based on the third device, and
the identifying the first data is performed based on the received second data.

14. The method of claim 10, wherein the identifying the first device comprises identifying a battery of the wearable electronic device as the first device, and
wherein the first data represents information related to the battery.

15. The method of claim 10, wherein the identifying the first device and the second device comprises identifying an application processor of the wearable electronic device as the first device and identifying a speaker of the external electronic device as the second device, and
wherein the first data comprises sound data configured to be output through the speaker.

16. An electronic device configured to accommodate a wearable electronic device, the electronic device comprising at least one processor,
wherein the at least one processor is configured to:
identify that the wearable electronic device is accommodated in the electronic device,
receive information on at least one device included in the wearable electronic device from the wearable electronic device, in response to identifying that the wearable electronic device is accommodated in an external electronic device,
based on the information on the at least one device included in the wearable electronic device and information on at least one device included in the electronic device, identify a first device among the at least one device included in the wearable electronic devices and identify a second device among the at least one device included in the electronic device,
receive, from the wearable electronic device, first data identified based on data obtained through the first device, and
control the second device, based on the received first data,
wherein the at least one processor is configured to:
identify a master device among the wearable electronic device and the electronic device; and
identify the first device and the second device, based on identification that the electronic device is the master device.

17. The electronic device of claim 16, wherein the at least one processor is configured to transmit information on a user input made to the electronic device to the wearable electronic device, based on identification that the wearable electronic device is not accommodated in the electronic device.

\* \* \* \* \*